United States Patent
Taira et al.

(10) Patent No.: US 10,623,068 B2
(45) Date of Patent: Apr. 14, 2020

(54) TRANSMISSION DEVICE, COMMUNICATION SYSTEM, AND PRECODING COMPUTATION METHOD

(71) Applicant: MITSUBISHI ELECTRIC CORPORATION, Tokyo (JP)

(72) Inventors: Akinori Taira, Tokyo (JP); Hiroshi Nishimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/300,482

(22) PCT Filed: Jun. 20, 2016

(86) PCT No.: PCT/JP2016/068236
§ 371 (c)(1),
(2) Date: Mar. 11, 2019

(87) PCT Pub. No.: WO2017/221291
PCT Pub. Date: Dec. 28, 2017

(65) Prior Publication Data
US 2019/0372631 A1    Dec. 5, 2019

(51) Int. Cl.
*H04B 7/0452* (2017.01)
*H04B 1/7103* (2011.01)
*H04B 7/0426* (2017.01)

(52) U.S. Cl.
CPC ......... *H04B 7/0452* (2013.01); *H04B 1/7103* (2013.01); *H04B 7/043* (2013.01)

(58) Field of Classification Search
CPC ...... H04B 7/0617; H04B 7/04; H04B 7/0452; H04B 1/7103; H04B 7/043; H04W 72/1226
See application file for complete search history.

(56) References Cited

U.S. PATENT DOCUMENTS 10,033,446 B2    7/2018  Nishimoto et al.
10,090,898 B2   10/2018  Nishimoto et al.
(Continued)

OTHER PUBLICATIONS

Choi et al., "A Transmit Preprocessing Technique for Multiuser MIMO Systems Using a Decomposition Approach", IEEE Transactions on Wireless Communications, vol. 3, No. 1, Jan. 2004, pp. 20-24.
(Continued)

*Primary Examiner* — Sung S Ahn
(74) *Attorney, Agent, or Firm* — Birch, Stewart, Kolasch & Birch, LLP

(57) ABSTRACT

A transmission device to be applied to a communication system configured to carry out multi-user MIMO downlink communication, includes a precoder configured to apply transmission precoding processing, a nonlinear processor configured to carry out successive interference cancellation, a beam forming controller configured to form a plurality of beams and to control a beam radiation direction, and a user ordering processor configured to estimate a positional relationship among the plurality of user terminals from radiation direction information on each of the beams, order users in ascending order of a distance from a specific user, and determine a pairing of a transmission target user and an interference permissible user. The precoder determines two users of the transmission target user and the interference permissible user for each user based on the pairing result, and carries out null steering for users other than the two users, to thereby carry out the transmission precoding processing.

8 Claims, 9 Drawing Sheets

(56) References Cited

U.S. PATENT DOCUMENTS

| | | | | |
|---|---|---|---|---|
| 2012/0115497 A1* | 5/2012 | Tolli | ................ | H04B 7/022 455/452.2 |
| 2012/0315938 A1 | 12/2012 | Van Nee et al. | | |
| 2016/0234694 A1* | 8/2016 | Yamazaki | ............. | H04W 16/28 |

OTHER PUBLICATIONS

Harashima et al., "Matched-Transmission Technique for Channels with Intersymbol Interference", IEEE Transactions on Communications, vol. 20, No. 4, Aug. 1972, pp. 774-780.

Hochwald et al., "A Vector-Perturbation Technique for Near-Capacity Multiantenna Multiuser Communication—Part II: Perturbation", IEEE Transactions on Communications, vol. 53, No. 3, pp. 537-544, Mar. 2005.

Minjoong Rim, "Multi-user downlink beamforming with multiple transmit and receive antennas", Electronics Letters, vol. 38, No. 25, pp. 1725-1726, Dec. 5, 2002.

Nishimoto et al., "A Study on Nonlinear Block Multi-diagonalization Precoding for High SHF Wide-band Massive MIMO in 5G", IEICE Technical Report, vol. 115, No. 472, RCS2015-377, pp. 255-260, Mar. 2016.

Taira et al., "OFDM Performance of Nonlinear Block Multi-diagonalization Precoding for High SHF Wide-band Massive MIMO in 5G", IEICE Technical Report, vol. 116, No. 11, RCS2016-13, pp. 71-76, Apr. 2016.

Extended European Serch Report issued in corresponding European Applicatian No. 16906210.6 dated Mar. 28, 2019.

Jun Zhang et al., "Coordinated Multi-cell MIMO Systems with Cellular Block Diagonalization", Conference Record of the Forty-First Asilomar Conference on Signals, Systems & Computers, 2007, Nov. 4-7, 2007, pp. 1669-1673.

Mohammed S. K. et al., "A Low Complexity User Grouping Based Multiuser MISO Downlink Precoder", Global Telecommunications Conference, Dec. 5, 2011, pp. 1-6.

Ni Weiheng et al., "Hybrid Block Diagonalization for Massive Multiuser MIMO Systems," IEEE Transactions on Communications, vol. 64, No. 1, Jan. 1, 2016, pp. 201-211.

Nishimoto Hiroshi et al., "Block lower multi-diagonalization for multiuser MIMO downlink", 2016 IEEE Wireless Communications and Networking Conference, IEEE, Apr. 3, 2016, pp. 1-6.

\* cited by examiner

TRANSMISSION DEVICE, COMMUNICATION SYSTEM, AND PRECODING COMPUTATION METHOD

TECHNICAL FIELD

The present invention relates to a transmission device, a communication system, and a precoding computation method, which are to be used in multi-user MIMO downlink communication.

BACKGROUND ART

In recent years, as a wireless communication system for achieving a high-speed transmission in a limited frequency band, there has been actively studied a multi-user multiple-input multiple-output (MU-MIMO) system obtained by extending a MIMO system, in which a plurality of antennas are installed both in a receiver and a transmitter, so that the space division multiple access (SDMA) may be applied to the MIMO system.

The MU-MIMO is a system form in which a plurality of user terminals each including a plurality of antennas exist for a base station including a plurality of antennas, and simultaneous transmission is carried out for the plurality of terminals in the same wireless frequency band.

A subject of the present invention is an MU MIMO downlink for transmitting a signal from the base station to the respective user terminals. FIG. 1 is an explanatory diagram for illustrating the MU-MIMO downlink, which is the subject of the present invention.

In this case, the number of reception user terminals is indicated by $N_{usr}$ ($N_{usr} \geq 2$), the number of antennas of a user # u (u=1, 2, . . . , $N_{usr}$) is indicated by $N_{r,u}$ ($N_{r,u} \geq 1$), and the number of antennas of the transmission base station is indicated by $N_t$ ($N_t \geq 1$). Therefore, the total number of reception antennas of all the users is given as follows.

$$N_{r,total} = N_{r,1} + N_{r,2} + \ldots + N_{r,Nusr}$$

Moreover, an $N_{r,u} \times N_t$ channel matrix from the transmission base station to the user # u is indicated by $H_u$. In the MU-MIMO downlink, the signals are simultaneously transmitted from the base station to the respective user terminals. Therefore, reception signals received at the user terminal generally include signals to be transmitted to other users as well as a desired signal. In other words, inter-user interference (IUI) occurs.

It is desired that a countermeasure against the IUI be taken as much as possible at a base station, in which restrictions on a processing amount and the number of the antennas are less strict than those on the user terminal. Thus, in the MU-MIMO downlink, transmission precoding carried out at the base station is indispensable as the countermeasure against the IUI.

As representative precoding for achieving the MU-MIMO downlink, block diagonalization (BD) is widely studied (for example, refer to Non Patent Literatures 1 and 2). The BD method is a precoding method of directing null to users other than a desired user to form a beam space so that the signal is transmitted only to the desired user.

An MU-MIMO environment in which the IUI does not occur at all can be achieved by carrying out this operation for all the users, and a receiver configuration in the terminal can consequently be simplified. Meanwhile, the BD method consumes the degree of freedom of the antennas for the IUI removal (nulling), and has thus a problem in that a great reduction in desired power occurs.

To address this problem, there is proposed a nonlinear-BMD (NL-BMD) method, which combines a block multi-diagonalization (BMD) method of permitting IUI of a part of users to secure a diversity gain and a method of suppressing residual IUI through pre-canceling with each other (for example, refer to Non Patent Literatures 3 to 5).

CITATION LIST

Non Patent Literature

[NPL 1] M. Rim, "Multi-user downlink beamforming with multiple transmit and receive antennas," Electron. Lett., vol. 38, no. 25, pp. 1725-1726, December 2002.

[NPL 2] L. U. Choi and R. D. Murch, "A transmit preprocessing technique for multiuser MIMO systems using a decomposition approach," IEEE Trans. Wireless Commun., vol. 3, no. 1, pp. 20-24, January 2004.

[NPL 3] Hiroshi Nishimoto, Akinori Taira, Hiroki Iura, Shigeru Uchida, Akihiro Okazaki, and Atsushi Okamura, "A Study on Nonlinear Block Multi-diagonalization Precoding for High SHF Wide-band Massive MIMO in 5G", IEICE technical report, vol. 115, no. 472, RCS2015-377, pp. 255-260, March 2016.

[NPL 4] H. Harashima and H. Miyakawa, "Matched-transmission technique for channels with intersymbol interference," IEEE Trans. Commun., vol. 20, August 1972.

[NPL 5] B. M. Hochwald, C. B. Peel, and A. L. Swindlehurst, "A vector-perturbation technique for near-capacity multi-antenna multiuser communication—Part II: Perturbation," IEEE Trans. Commun., vol. 53, no. 3, pp. 537-544, March 2005.

SUMMARY OF INVENTION

Technical Problem

However, the related art has the following problems.

With the linear precoding method represented by the BD method, it is known that when a user to be excluded, namely, a user to which the IUI pre-cancellation is to be applied, is close in distance, a desired power greatly decreases, and thus the signal-to-noise power ratio (SNR) deteriorates. The BMD method is also a type of liner precoding, and the SNR thus decreases when a user to be excluded is close in distance.

Meanwhile, the IUI pre-cancellation (IUI PC) through the pre-canceling is a non-linear operation on the transmission side, and provides a stable transmission characteristic almost independently of the position of a user to which the IUI pre-cancellation is to be applied. However, the arrangement of users cannot be determined in advance, and varies as the time elapses. Therefore, a close user is not always specified as the IUI permissible user. As a result, there is a problem in that a close user is specified as the subject of the IUI pre-cancellation through the BMD method, and the SNR decreases as in the BD method.

The present invention has been made in view of the above-mentioned problems, and therefore has an object to obtain a transmission device, a communication system, and a precoding computation method, which are capable of providing transmission precoding having a higher transmission diversity gain than that of the related-art BD method.

Solution to Problem

According to one embodiment of the present invention, there is provided a transmission device, which is to be applied to a communication system in which a plurality of user terminals each including one or a plurality of reception antennas exist for a transmission device including a plurality of transmission antennas so that multi-user MIMO downlink communication is carried out, the transmission device including: a precoder configured to apply transmission precoding processing to a transmission signal to be transmitted to each of the plurality of user terminals; a nonlinear processor configured to carry out successive interference cancellation for the transmission signal to which the transmission precoding processing has been applied; and a beam forming controller configured to form a plurality of beams, a number of which is smaller than a number of the plurality of transmission antennas, based on the transmission signal for which the successive interference cancellation has been carried out, and to control a phase shifter or a digital signal processor, which is connected to the plurality of transmission antennas, to control a beam radiation direction, wherein the transmission device further includes a user ordering processor configured to estimate a positional relationship among the plurality of user terminals from radiation direction information on each of the plurality of beams held by the beam forming controller, order users in ascending order of a distance from a specific user, determine a pairing of a transmission target user and an interference permissible user, and transmit a determination result to the precoder, and wherein the precoder is configured to determine two users of the transmission target user and the interference permissible user for each user based on the determination result received from the user ordering processor, and carry out null steering for users other than the two users, to thereby carry out the transmission precoding processing.

Further, according to one embodiment of the present invention, there is provided a communication system including: the plurality of transmission devices of the present invention; and a control station configured to supervise and control the plurality of transmission devices, wherein the control station is configured to generate beam direction information and ordering information on each of the plurality of transmission devices so that radiation regions of beams are inhibited from overlapping one another among the plurality of transmission devices, and then transmit the beam direction information and the ordering information to each of the plurality of transmission devices, and wherein each of the plurality of transmission devices is configured to control the beam radiation direction based on the beam direction information, and carry out the transmission precoding processing based on the ordering information.

Further, according to one embodiment of the present invention, there is provided a precoding computation method, which is carried out in a transmission device to be applied to a communication system in which a plurality of user terminals each including one or a plurality of reception antennas exist for a transmission device including a plurality of transmission antennas so that multi-user MIMO downlink communication is carried out, the precoding computation method including: a first step of applying transmission precoding processing to a transmission signal to be transmitted to each of the plurality of user terminals; a second step of carrying out successive interference cancellation for the transmission signal to which the transmission precoding processing has been applied; and a third step of forming a plurality of beams, a number of which is smaller than a number of the plurality of transmission antennas, based on the transmission signal for which the successive interference cancellation has been carried out, and controlling a phase shifter or a digital signal processor, which is connected to the plurality of transmission antennas, to control a beam radiation direction, wherein the precoding computation method further includes a fourth step of estimating a positional relationship among the plurality of user terminals based on the beam radiation directions controlled in the third step, ordering users in ascending order of a distance from a specific user, and determining a pairing of a transmission target user and an interference permissible user, and wherein the first step includes determining two users of the transmission target user and the interference permissible user for each user based on the pairing determined in the fourth step, and carrying out null steering for users other than the two users, to thereby carry out the transmission precoding processing.

Advantageous Effects of Invention

According to the embodiments of the present invention, there is provided the configuration capable of carrying out the precoding that permits the user next to the target user as the IUI user, to thereby hierarchize the multi-user space in the MU-MIMO downlink. As a result, the transmission device, the communication system, and the precoding computation method capable of providing the transmission precoding having a higher transmission diversity gain than that of the related-art BD method can be obtained.

DESCRIPTION OF EMBODIMENTS

A description is now given of a transmission device, a communication system, and a precoding computation method according to preferred embodiments of the present invention with reference to the drawings. A physical transmission antenna or reception antenna is hereinafter referred to as "antenna". Further, an effective array element observed when a transmission array or a reception array is multiplied by a weight is hereinafter referred to as "branch".

In first and second embodiments of the present invention, for the sake of simple description, it is assumed that the number of reception antennas of each user terminal is $N_r$ independently of the user terminal. Moreover, it is assumed that reception signals are multiplied by $N_w$ ($N_w \geq N_r$) weights in the reception array, to thereby set the number of reception branches per user observed from the transmission station to $N_w$ independently of the user terminal. As a result, a total number of branches of all users is given as follows.

$$N_{w,total} = N_{usr} \times N_w$$

In this case, the weights to be applied to the reception array are assumed in calculation of a precoding matrix, and any weights can be applied. Moreover, when $N_w = N_r$, the precoding matrix may be a unit matrix or an eigenvector matrix of a channel matrix, and is not limited in the present invention.

Figure 1:
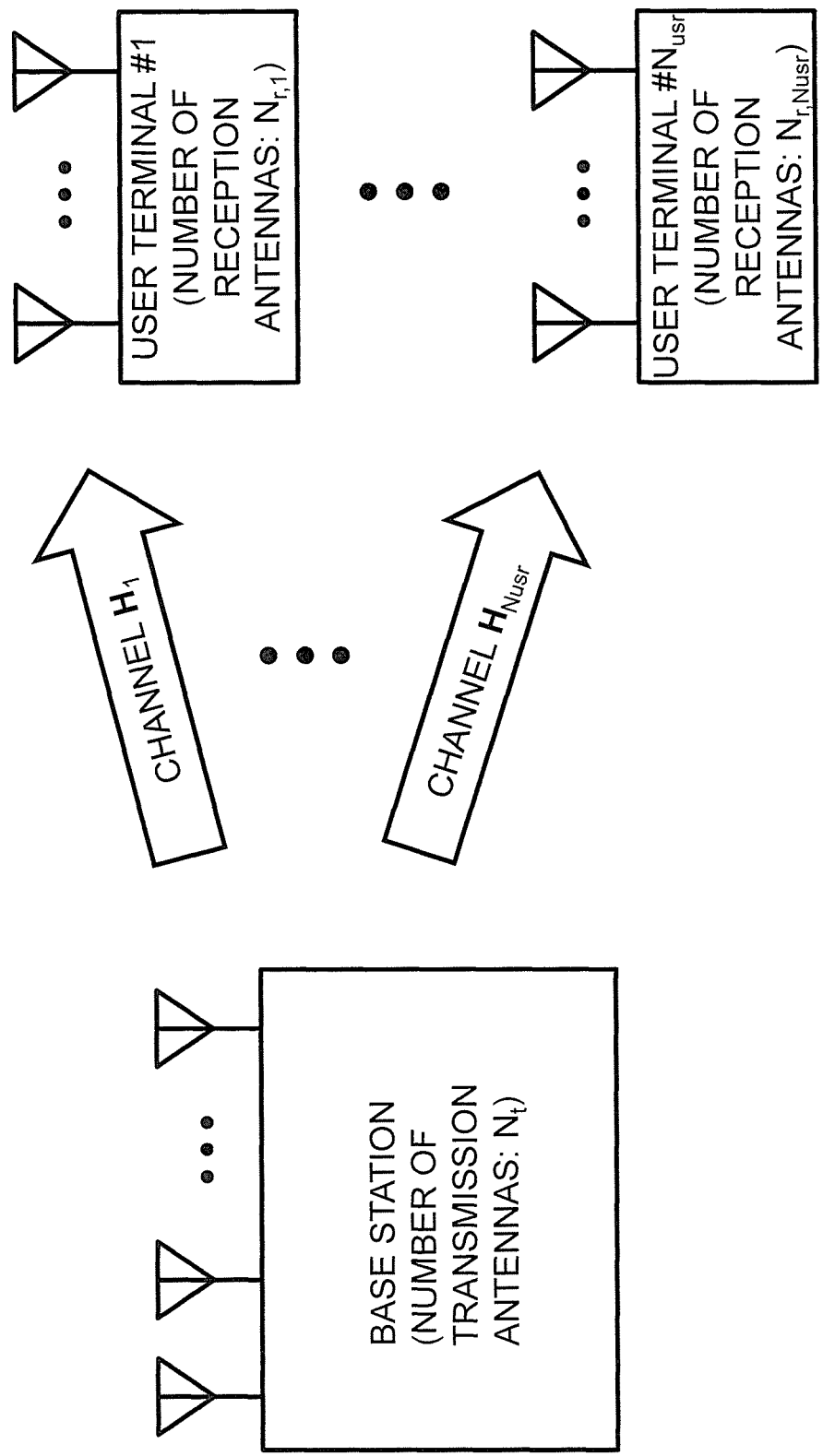
FIG. 1 is an explanatory diagram for illustrating an MU-MIMO downlink, which is a subject of the present invention.

The first and second embodiments described below are applicable to any number of reception branches. Thus, as illustrated in FIG. 1, the number of antennas and the number of branches may vary for each the user.

Moreover, the number of transmission antennas and the number of reception branches are assumed to satisfy the following relationship.

$$N_t \geq N_{w,total} - N_w = (N_{usr} - 1) \times N_w$$

Figure 2:
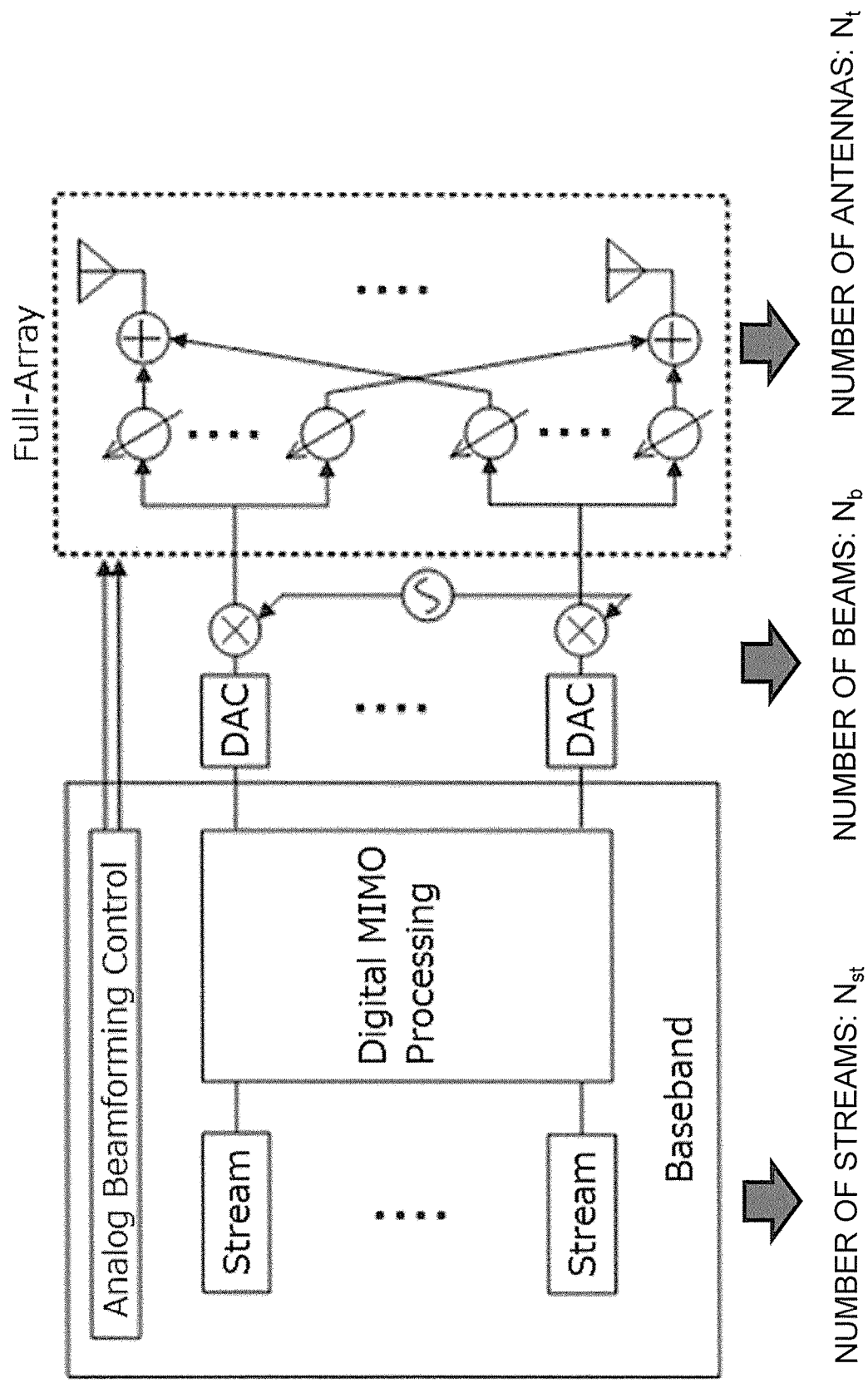
FIG. 2 is a diagram for illustrating an example of a hybrid configuration of an array antenna in the present invention, which is a full-array type hybrid configuration.

A plurality of configuration methods for the array antenna are conceivable. In the Massive MIMO having a very large number of antennas and the like, a hybrid configuration in which the analog beam forming and the MIMO signal processing are combined with each other is used. FIG. 2 is a diagram for illustrating an example of the hybrid configuration of the array antenna in the present invention, which is a full array type hybrid configuration. In the configuration of FIG. 2, $N_b$, which is the number of beams, sets of phase shifters each connected to the antenna are prepared.

Each of the $N_b$ DACs outputs a signal transmitted from each of the beams. The transmission beams are formed by all the antennas by setting the phase shifters. In general, the number of beams is sufficiently smaller than the number of antennas. Therefore, the required numbers of digital devices, namely, the numbers of the DACs and ADCs are suppressed, and thus the structure can be simplified.

Figure 3:
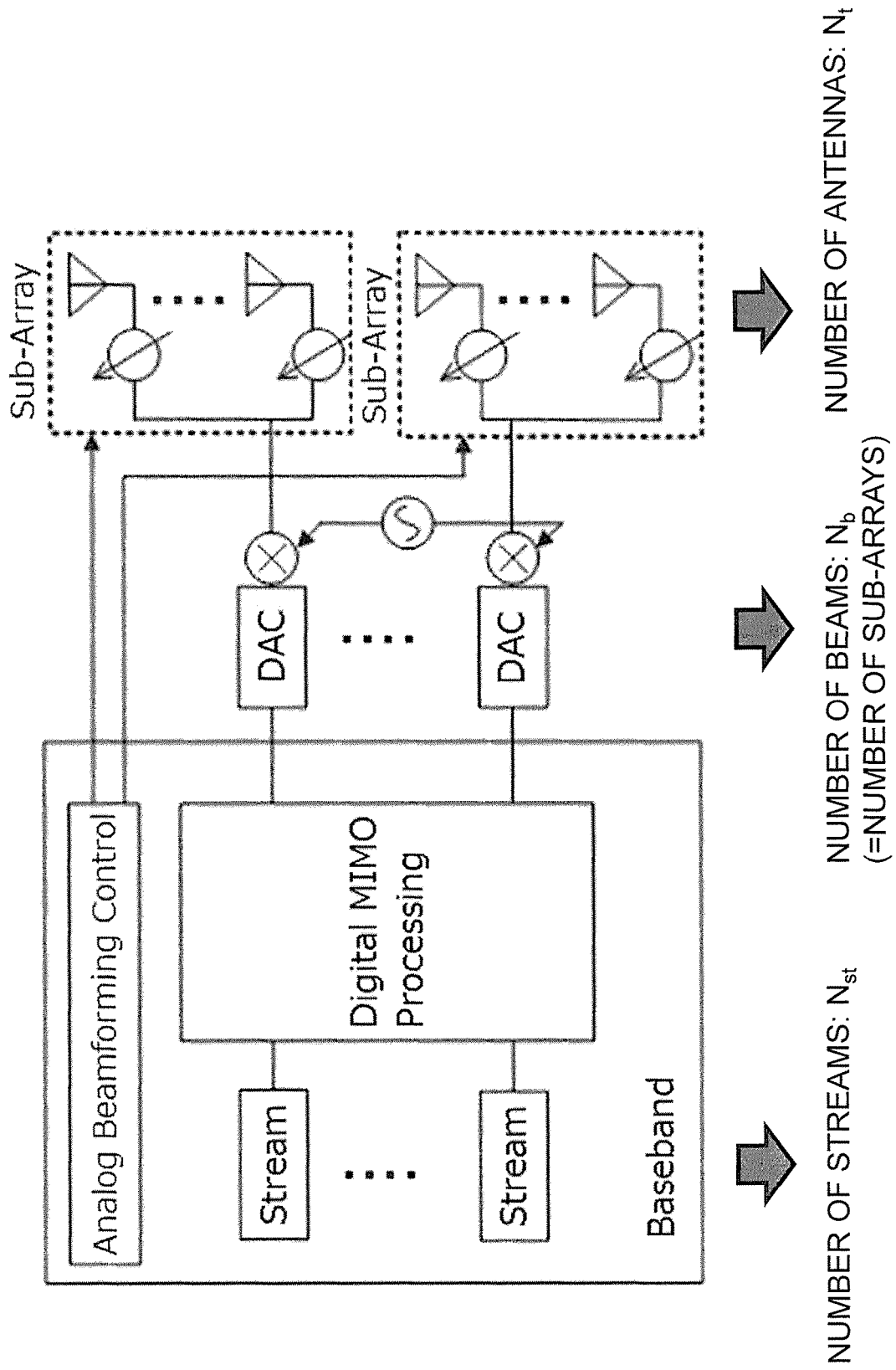
FIG. 3 is a diagram for illustrating an example of the hybrid configuration of the array antenna in the present invention, which is a sub-array type hybrid configuration.

FIG. 3 is a diagram for illustrating an example of the hybrid configuration of the array antenna in the present invention, which is a sub-array type hybrid configuration. In the configuration of FIG. 3, the antennas are divided into sub-arrays, and a beam is formed for each of the sub-arrays by phase shifters.

Compared with the full-array configuration, in the sub-array configuration, the number of antennas available for one beam decreases, but as many phase shifters as the number of antennas are only required to be prepared. Therefore, an analog portion is simplified. However, in the sub array configuration, as many digital devices as the number of beams are required as in the full-array configuration.

Figure 4:
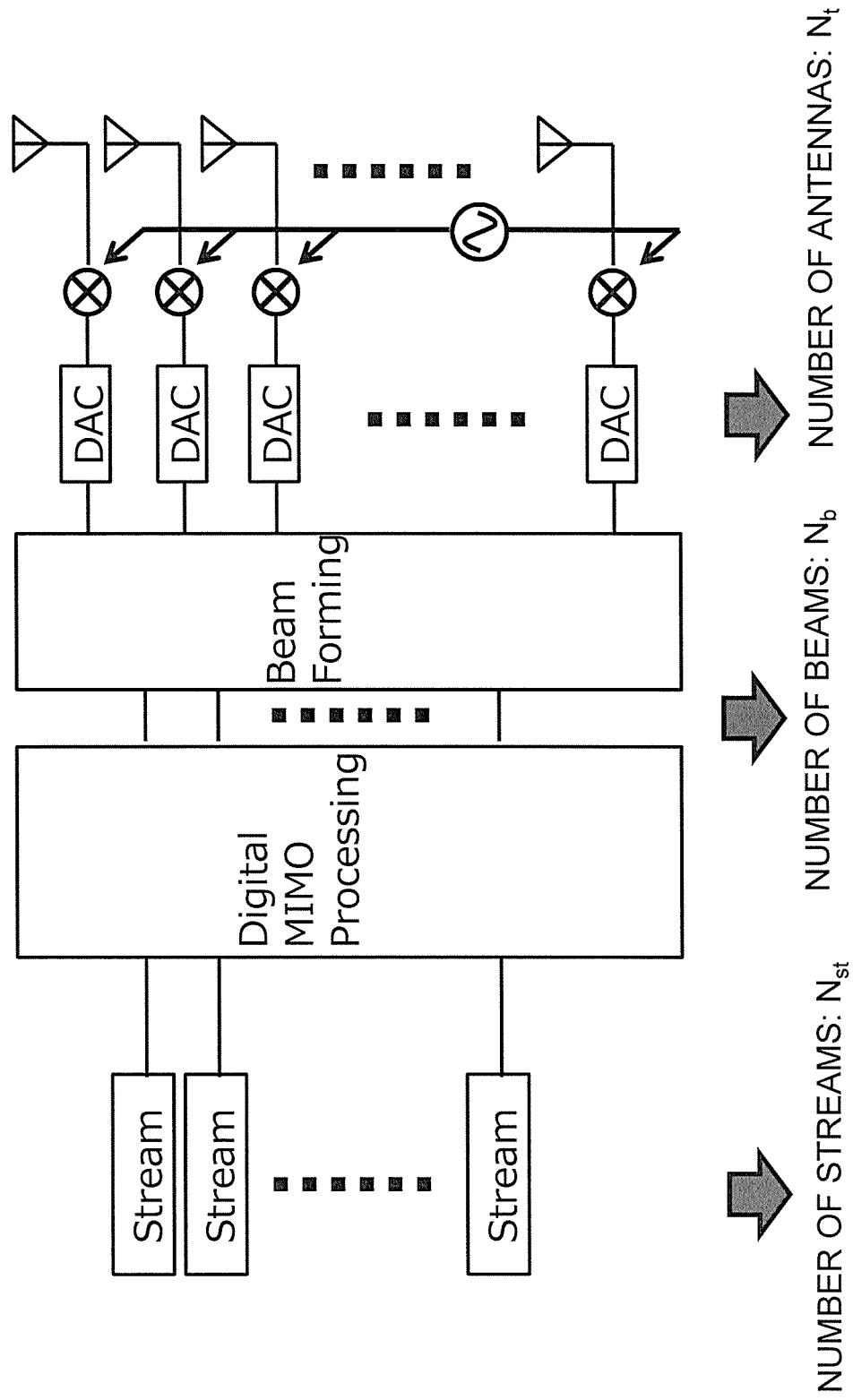
FIG. 4 is a diagram for illustrating a full-digital type configuration of the array antenna in the present invention.

The configurations of FIG. 2 and FIG. 3 are often used in the case of the analog-digital hybrid, but may also be used in the digital Massive-MIMO. FIG. 4 is a diagram for illustrating a full-digital type configuration of the array antenna in the present invention. In the configuration of FIG. 4, as many digital devices as the number of antennas are required.

Processing equivalent to the beam forming carried out by the phase shifters is carried out through digital signal processing by a beam forming unit ("Beam Forming") in the full digital configuration.

This configuration cannot reduce the number of digital devices, but the computation in MIMO Processing can be carried out through processing at as many spatial degrees of freedom not as the number $N_t$ of antennas, but as the number $N_b$ of beams. Therefore, a computation processing amount can be reduced. The beam forming unit can be adapted to both of the processing for the full-array and the processing for the sub-array.

Figure 5:
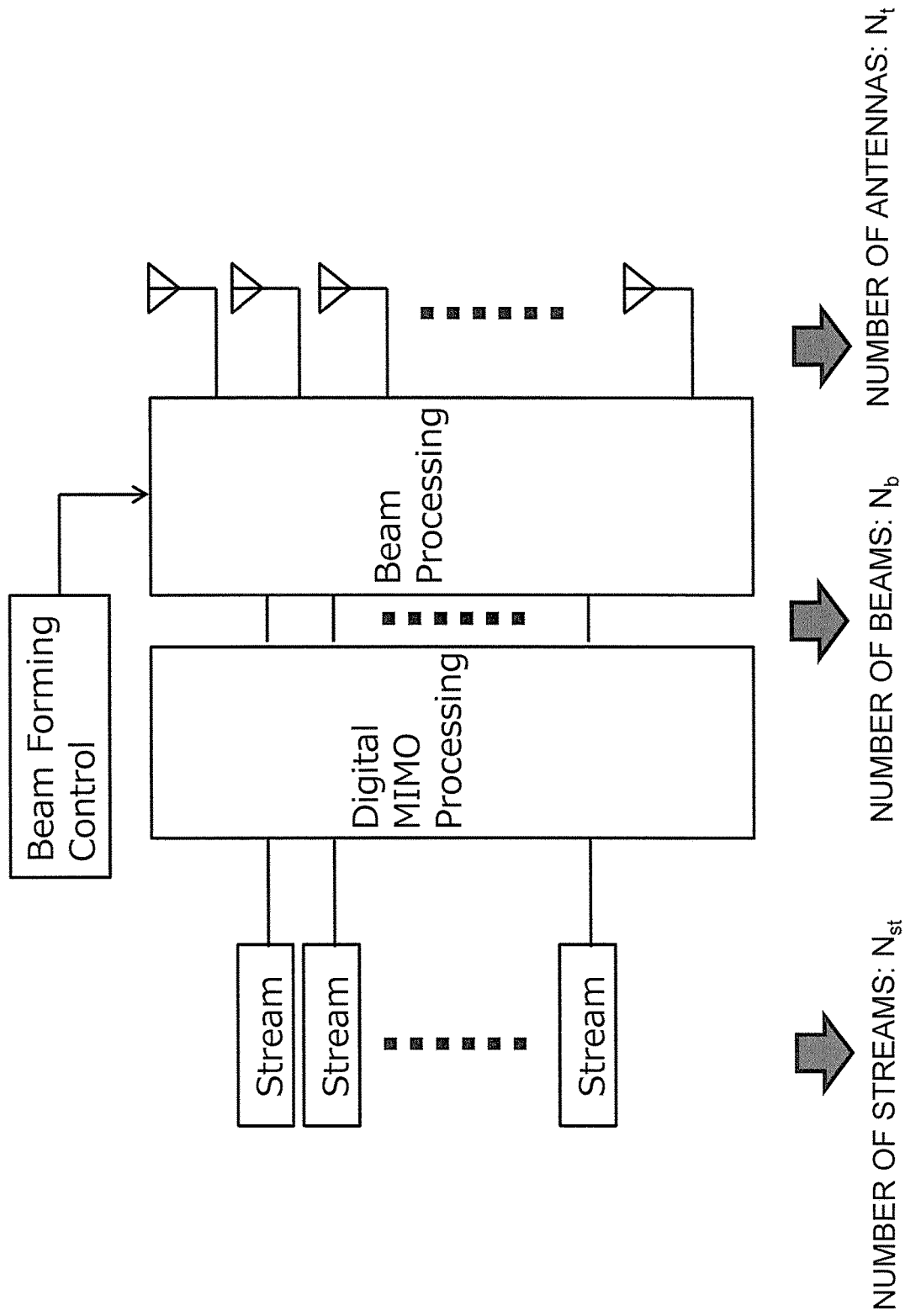
FIG. 5 is an explanatory diagram for illustrating an array antenna configuration in the present invention, in which beam forming units are unified.

The present invention can be applied to any one of the configurations of the array antenna and the beam forming methods of FIG. 2 to FIG. 4. Thus, a description is given of a configuration of FIG. 5, in which the beam forming units are unified. FIG. 5 is an explanatory diagram for illustrating the array antenna configuration in the present invention, in which the beam forming unit is unified.

In the first embodiment, downlink communication from a base station to user terminals is assumed to be carried out, the base station is assumed to be a transmission device, and a user terminal is assumed to be a reception device. As a type of the secondary modulation method, the multi-carrier type such as the orthogonal frequency division multiplex (OFDM) or the like may be applied, or the single-carrier type such as the single-carrier block transmission or the like may be applied.

In the following description, a method that is represented by the OFDM and the single-carrier block transmission, which divides a signal into blocks through the discrete Fourier transform processing and addition of the cyclic prefix (CP), is referred to as "block transmission". The present invention is not limited by the first and second embodiments described later.

Before the specific embodiments are described, the MU-MIMO downlink system configured to carry out the precoding is modeled by numerical expressions. For a user # i (i=1, 2, ..., $N_{usr}$), a transmission signal vector is indicated by $s_i(t)$, a transmission power distribution matrix is indicated by $P_i$, a transmission precoding matrix is indicated by $B_i$, a weight for forming a transmission beam is indicated by $F_i$, and a true $N_r \times N_t$ channel matrix is giver, as follows:
$\hat{H}_i$ An $N_w \times N_r$ reception weight matrix is indicated by $W_i$, a true reception signal vector before reception weight multiplication is indicated by $y_i(t)$, a reception signal vector after the reception weight multiplication is indicated by $r_i(t)$, and a true reception thermal noise vector is given as follows:
$\hat{n}_i(t)$ Then, a system model can be defined by the expression below.

$$\begin{bmatrix} r_1(t) \\ \vdots \\ r_{N_{usr}}(t) \end{bmatrix} = \begin{bmatrix} W_1 & \cdots & 0 \\ \vdots & \ddots & \vdots \\ 0 & \cdots & W_{N_{usr}} \end{bmatrix} \begin{bmatrix} y_1(t) \\ \vdots \\ y_{N_{usr}}(t) \end{bmatrix} = \begin{bmatrix} W_1 & \cdots & 0 \\ \vdots & \ddots & \vdots \\ 0 & \cdots & W_{N_{usr}} \end{bmatrix}$$

$$\left( \begin{bmatrix} \hat{H}_1 \\ \vdots \\ \hat{H}_{N_{usr}} \end{bmatrix} [F_1 \cdots F_{N_b}][B_1 \cdots B_{N_{usr}}] \begin{bmatrix} \sqrt{P_1} & \cdots & 0 \\ \vdots & \ddots & \vdots \\ 0 & \cdots & \sqrt{P_{N_{usr}}} \end{bmatrix} \right.$$

$$\left. \begin{bmatrix} s_1(t) \\ \vdots \\ s_{N_{usr}}(t) \end{bmatrix} + \begin{bmatrix} \hat{n}_1(t) \\ \vdots \\ \hat{n}_{N_{usr}}(t) \end{bmatrix} \right)$$

A digital MIMO processing unit of FIG. 5 cannot observe a channel of each of the antennas, and observes a channel for each beam formed in a specific direction.

An $N_w \times N_b$ matrix obtained by multiplying the reception weight matrix, the true channel matrix, and the transmission beam formation weights F by one another is set as a new channel matrix $H_i$. An $N_w$th-order vector obtained by multiplying the true reception thermal noise vector by the reception weight matrix is set as a new reception thermal noise vector $n_i$. In this case, the system model is given by the expression described below.

$$\begin{bmatrix} r_1(t) \\ \vdots \\ r_{N_{usr}}(t) \end{bmatrix} = \begin{bmatrix} H_1 \\ \vdots \\ H_{N_{usr}} \end{bmatrix} [B_1 \ \ldots \ B_{N_{usr}}] \quad (1)$$

$$\begin{bmatrix} \sqrt{P_1} & \cdots & 0 \\ \vdots & \ddots & \vdots \\ 0 & \cdots & \sqrt{P_{N_{usr}}} \end{bmatrix} \begin{bmatrix} s_1(t) \\ \vdots \\ s_{N_{usr}}(t) \end{bmatrix} + \begin{bmatrix} n_1(t) \\ \vdots \\ n_{N_{usr}}(t) \end{bmatrix}$$

Expression (1) can be expressed by Expression (2).

$$\overline{r}(t) = \overline{H}\overline{B}\overline{P}\overline{s}(t) + \overline{n}(t) \quad (2)$$

In this case, in Expression (2), $\overline{H}$ is defined as an $N_{w,total} \times N_b$ system channel matrix.

$\overline{B}$ is defined as an $N_b \times N_{st}$ system precoding matrix ($N_{st}$ is a total number of streams to all the users).

$\overline{P}$ is defined as a system transmission power matrix, which defines the transmission power distribution to the users.

$\overline{s}(t)$ is defined as an $N_{st}$th-order system transmission vector.

$\overline{n}(t)$ is defined as an $N_{w,total}$-th-order system noise vector after multiplication of the reception weight.

A product of $\overline{H}$ and $\overline{B}$ can be considered as an effective system channel matrix $\overline{H}_e$ through transmission branch formation, and is given by Expression (3).

$$\overline{H}_e = \begin{bmatrix} H_1 B_1 & H_1 B_2 & \cdots & H_1 B_{N_{usr}} \\ H_2 B_1 & H_2 B_2 & \cdots & H_2 N_{N_{usr}} \\ \vdots & \vdots & \ddots & \vdots \\ H_{N_{usr}} B_1 & H_{N_{usr}} B_2 & \cdots & H_{N_{usr}} B_{N_{usr}} \end{bmatrix} \quad (3)$$

A transmission precoding method involving, in the effective system channel matrix given by Expression (3), only keeping block diagonal elements, namely, $H_i B_i$ (i=1, 2, ..., $N_{usr}$), and setting a zero matrix O to each of the other non-block diagonal elements is a related-art BD method disclosed in Non Patent Literatures 1 and 2. Moreover, an effective system channel matrix given by Expression (4) is the block bi-diagonalization (BBD) disclosed in Non Patent Literature 3.

$$\overline{H}_e = \begin{pmatrix} H_1B_1 & 0 & 0 & 0 & 0 & 0 & 0 & 0 \\ H_2B_1 & H_2B_2 & 0 & 0 & 0 & 0 & 0 & 0 \\ 0 & H_3B_2 & H_3B_3 & 0 & 0 & 0 & 0 & 0 \\ 0 & 0 & H_4B_3 & H_4B_4 & 0 & 0 & 0 & 0 \\ 0 & 0 & 0 & H_5B_4 & H_5B_5 & 0 & 0 & 0 \\ 0 & 0 & 0 & 0 & H_6B_5 & H_6B_6 & 0 & 0 \\ 0 & 0 & 0 & 0 & 0 & H_7B_6 & H_7B_7 & 0 \\ 0 & 0 & 0 & 0 & 0 & 0 & H_8B_7 & H_8B_8 \end{pmatrix} \quad (4)$$

The BBD method is a BMD method in which the number of IUI permissible users is set to one. Expression (4) corresponds to an example in which $N_{usr}$ is eight. It can be understood that a first user obtains the second diversity order by permitting interference to a second user. For a user pair having residual IUI, interference is canceled through IUI-PC when the transmission signal is generated.

In the following, a detailed description is now given of the first embodiment and the second embodiment based on those technical details described above.

First Embodiment

Figure 6:
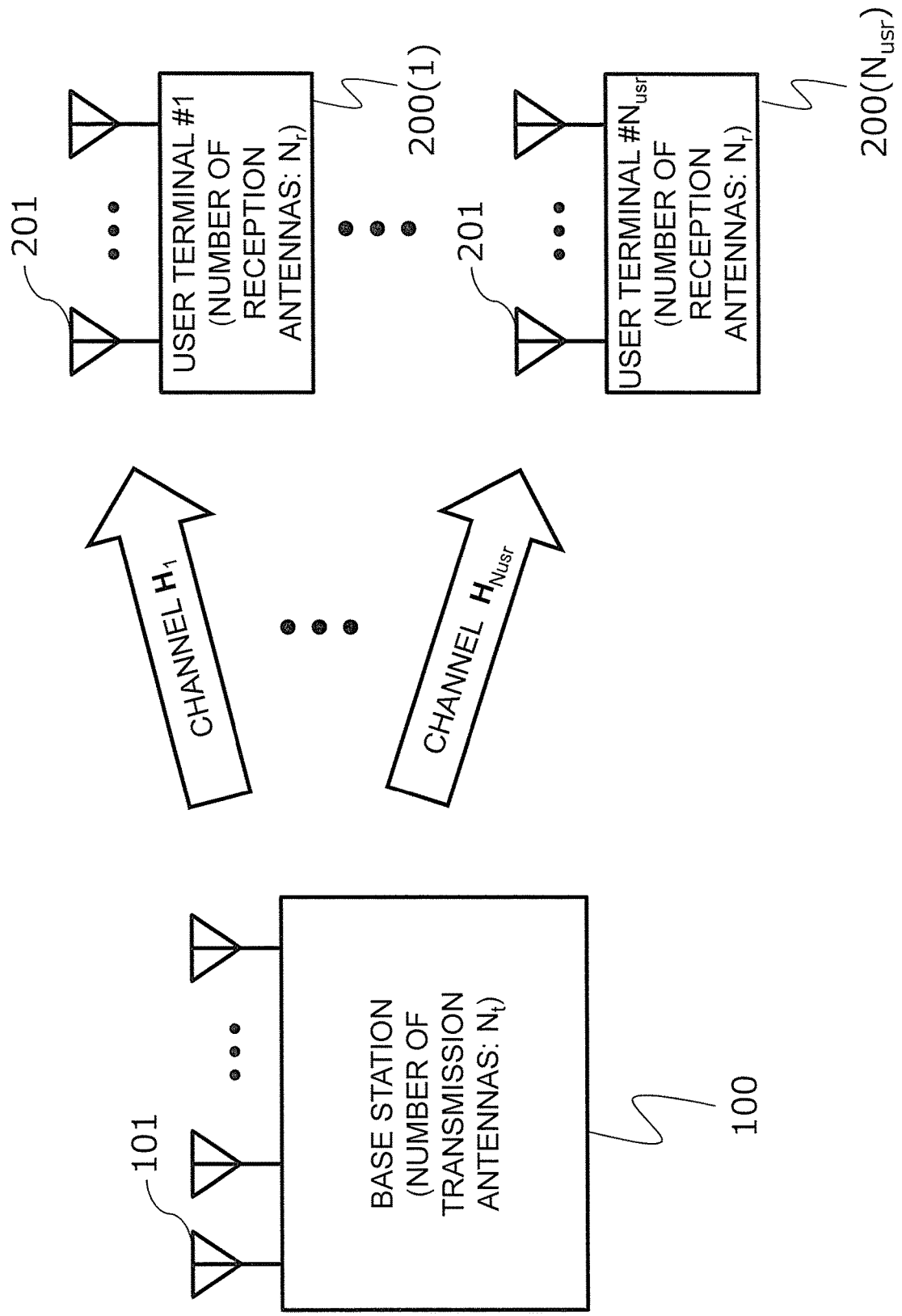
FIG. 6 is a configuration diagram for illustrating a communication system of a first embodiment of the present invention.

FIG. 6 is a configuration diagram for illustrating a communication system of the first embodiment of the present invention. The communication system of the first embodiment includes a base station including $N_t$ transmission antennas 101, namely, a transmission device 100, and a plurality of user terminals each including $N_r$ reception antennas 201, namely, $N_{usr}$ reception devices 200(1), ..., 200 ($N_{usr}$).

Configurations and signal processing of the respective reception devices 200(1) to 200($N_{usr}$) are the same as one another. Thus, a description of the reception device given below focuses on one certain reception device, and the description is given while this reception device is assumed as the reception device 200.

Figure 7:
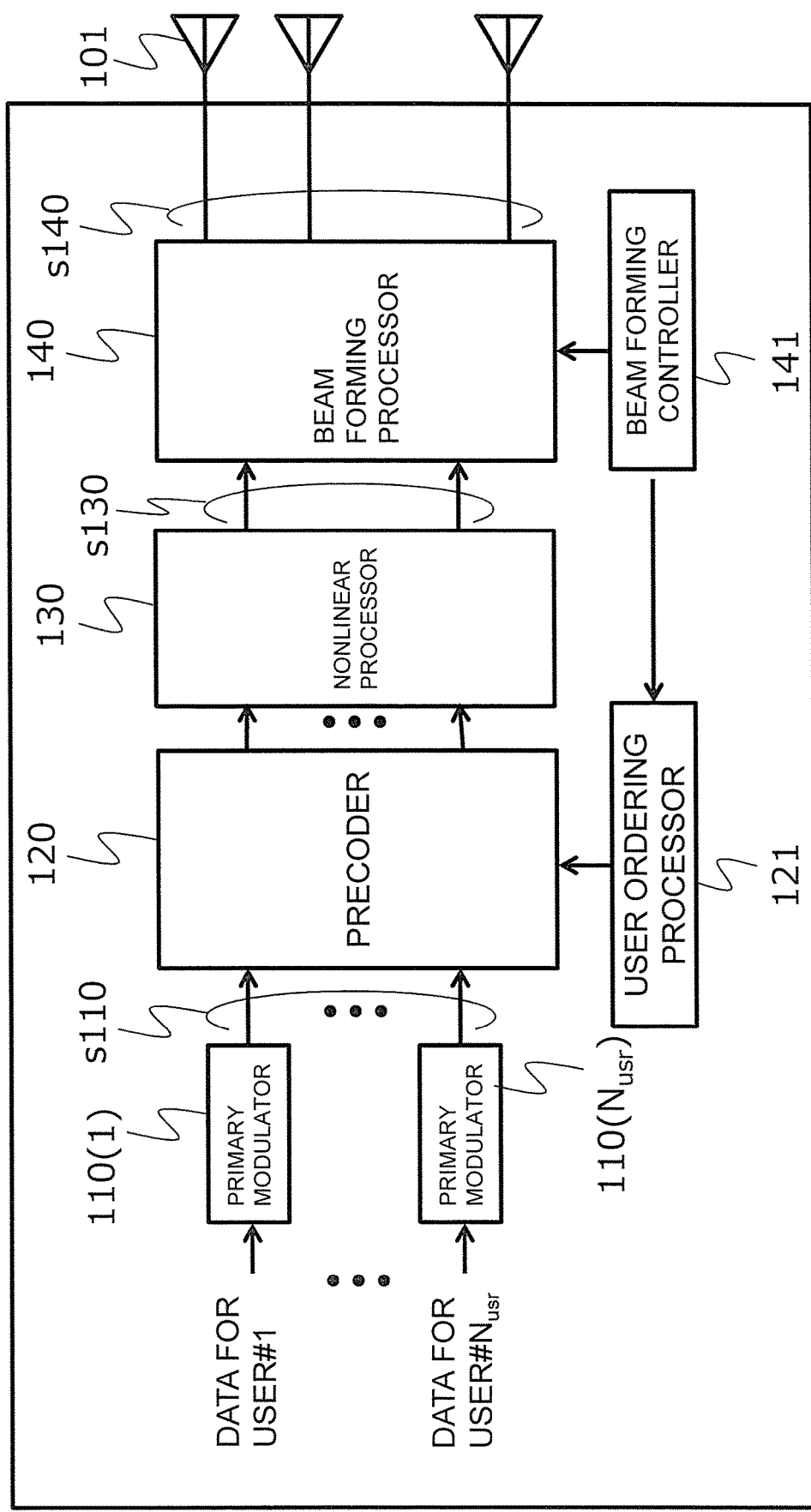
FIG. 7 is a diagram for illustrating a configuration of a transmission device of the first embodiment of the present invention.

FIG. 7 is a diagram for illustrating a configuration of the transmission device 100 of the first embodiment of the present invention. The transmission device 100 includes primary modulators 110(1) to 110 ($N_{usr}$), a precoder 120, a user ordering processor 121, a non-linear processor 130, a beam forming processor 140, and a beam forming controller 141.

Each of the $N_{usr}$ primary modulators 110 applies primary modulation to data for each of the users. The precoder 120 carries out the MU-MIMO precoding and the IUI-PC. During the MU-MIMO precoding and the IUI-PC, the user ordering processor 121 instructs the precoder 120 to carry out ordering of the users and power distribution in precoding application.

The non-linear processor 130 applies non-linear processing to data after the processing by the precoder 120. The beam forming processor 140 uses the plurality of antennas 101 to form beams. In this case, the beam forming controller 141 instructs a radiation direction of each of the beams.

As other configurations, transmission waveform shapers each configured to carry out secondary modulation, digital/analog (D/A) conversion, conversion from a baseband to a radio frequency (RF), and the like exist as function units in the transmission device 100. As illustrated in FIG. 2 to FIG. 5, the various configuration methods are conceivable, and it is thus assumed that the transmission waveform shapers are included in the beam forming processor 140.

In this case, the beam forming processor 140 is assumed to carry out mapping to primary modulation symbols, such as channel coding or quadrature amplitude modulation (QAM), in the primary modulation. Moreover, the beam forming processor 140 is assumed to include a function unit relating to discrete Fourier transform processing when the single carrier block transmission method is used.

Moreover, the transmission waveform shapers in the beam forming processor 140 are assumed to carry out the discrete Fourier transform and the CP addition processing before the D/A conversion when the block transmission is used. Moreover, signal processing means in the transmission waveform shapers may be of a digital processing type or an analog processing type.

Figure 8:
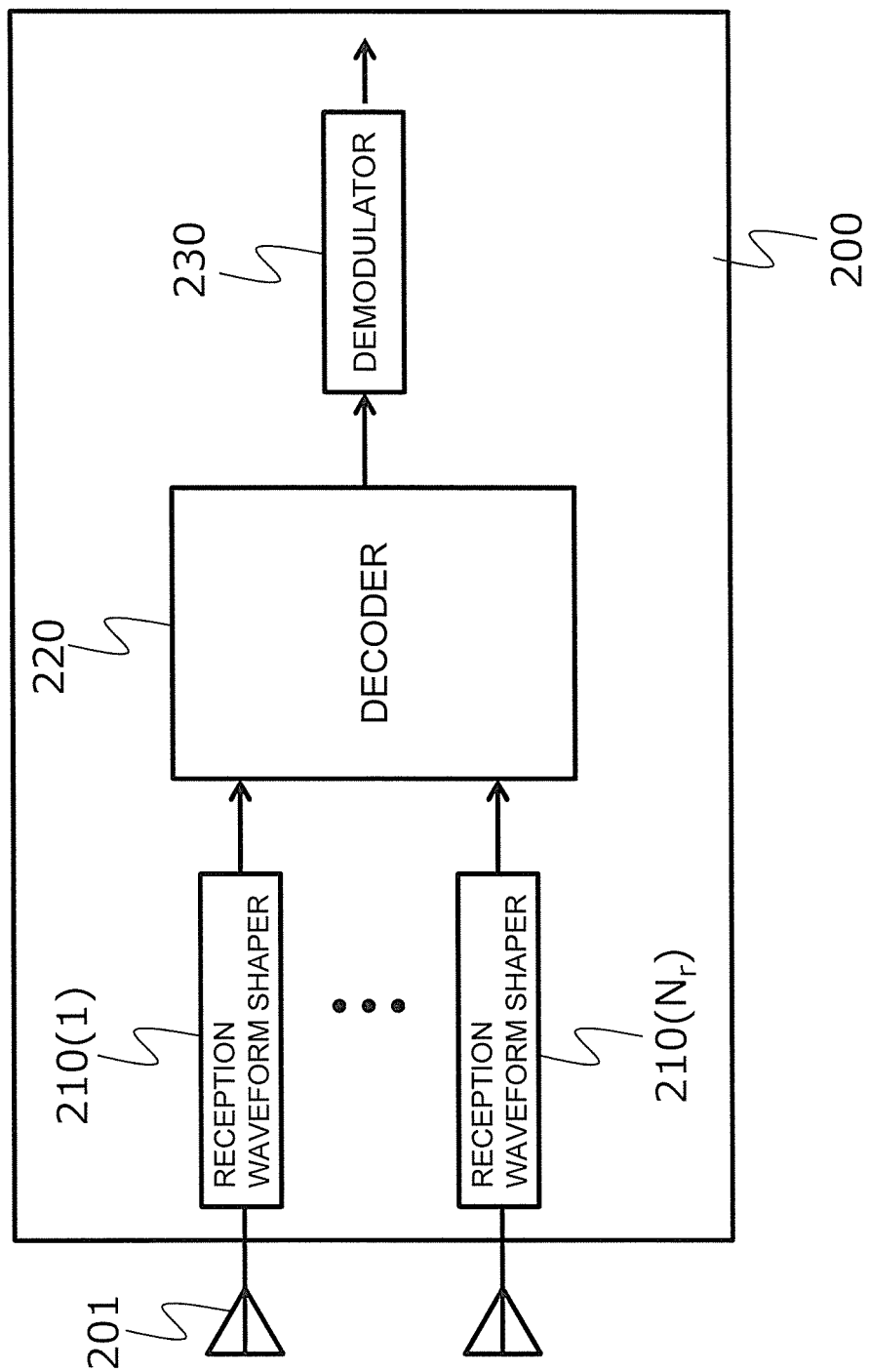
FIG. 8 is a diagram for illustrating a configuration of a reception device in the first embodiment of the present invention.

When an input signal from the primary modulator 110 to the precoder 120 is indicated as s110, s110 corresponds to $\bar{s}(t)$
of Expression (2).
When an output signal from the non-linear processor 130 to the beam forming processor 140 is indicated as s130, s130 corresponds to a portion of Expression (2) given as follows: $\overline{BPs}(t)$ FIG. 8 is a diagram for illustrating a configuration of the reception device 200 in the first embodiment of the present invention. The reception device 200 includes reception waveform shapers 210(1) to 210($N_r$), a decoder 220, and a demodulator 230.

Each of the $N_r$ reception waveform shapers 210(1) to 210($N_r$) carries out conversion from the RF to the baseband, analog/digital (A/D) conversion, signal filtering processing, and the like for a reception signal from each of the reception antennas 201. The decoder 220 carries out MU-MIMO decoding processing to extract a desired signal. Further, the demodulator 230 applies de-mapping and channel decoding processing to the signal after the MU-MIMO decoding.

In this case, the reception waveform shaper 210 is assumed to carry out CP removal and discrete Fourier transform before input to the decoder 220 when the block transmission is used. Then, signal processing means in the reception waveform shaper 210 may be of a digital processing type or an analog processing type.

Moreover, it is assumed that the demodulator 230 includes equalization processing of compensating frequency distortion and discrete inverse Fourier transform processing when the single carrier block transmission is used.

A description is now given of a calculation method for an MU-MIMO precoding matrix to be applied in the precoder 120 in the first embodiment. The present invention is applicable to any IUI permissible user in the BMD method. However, in the first embodiment, a description is given of an example (BBD method) in which the number of IUI permissible users is one.

In the following description, for the sake of simple discussion, the processing by the transmission waveform shapers included in the beam forming processor 140 and the reception waveform shapers 210 is omitted, and it is assumed that a portion between the output of the precoder 120 of the transmission device 100 and input to the decoder 220 of the reception device 200 is expressed as an equivalent baseband system.

Moreover, the following calculation process requires information on the channel matrix in the precoder 120. This information on the channel matrix can be provided by feedback of channel information estimated by the reception device 200 to the transmission device 100 when the downlink and the uplink are constructed based on frequency division duplex (FDD). Moreover, when the downlink and the uplink are constructed based on time division duplex (TDD), the channel information can be acquired through estimation of the channel by the transmission device 100 based on reversibility of the transmission/reception.

In order to obtain the precoding matrix for the user # i, one user the IUI for whom is permitted is selected in addition to the desired user # i. In the following description, the one user to be selected is referred to as "IUI user". The user once selected as an IUI user cannot be selected as an IUI user for the calculation of the precoding matrix for another user # p (p≠i).

In other words, the same user cannot be selected a plurality of times as an IUI user. As a supplementary description, when the number of IUI permissible users is M, the same user can be selected as an IUI user up to M times.

As an example, a description is given of a specific computation method for the precoding matrix when a user (# i+1) having the index next to that of the user # i is selected as an IUI user. From a system channel matrix given below,
$\overline{H}$
an ($N_{w,total}-2N_w$)×$N_b$ matrix, which is given by
$\overline{H}_i$
and from which elements of the transmission matrix corresponding to the desired user # i and the IUI user # i+1 are removed, is defined. It is assumed that singular value decomposition (SVD) can be carried out as given by Expression (5).

$$\overline{H}_i = \begin{bmatrix} H_1 \\ \vdots \\ H_{i-1} \\ H_{i+2} \\ \vdots \\ H_{N_{usr}-1} \end{bmatrix} = U_i \sum_i V_i^H = U_i \begin{bmatrix} \sum_i^{(s)} & 0 \\ 0 & 0 \end{bmatrix} \begin{bmatrix} V_i^{(s)H} \\ V_i^{(n)H} \end{bmatrix} \quad (5)$$

In Expression (5), $U_i$ is a left singular vector matrix of, $\overline{H}_i$, $V_i$ is a right singular vector matrix thereof, and $\Sigma_i$ is a singular value matrix having singular values as diagonal elements.

In the singular value matrix $\Sigma_i$, when singular values of the diagonal elements are arranged in descending order of the magnitude, as given by Expression (5), the singular value matrix $\Sigma E_i$ can be divided into, and can be expressed as a partial diagonal matrix $\Sigma_i^{(s)}$ constructed of ($N_{w,total}-2N_w$) non-zero singular values and zero matrices corresponding to ($N_r-(N_{w,total}-2N_w)$) zero singular values.

Moreover, right singular vectors $V_i^{(s)}$ and $V_i^{(n)}$ exist so as to correspond to the respective matrices expressed in the divided form. When $V_i^{(n)}$ is defined as a precoding matrix for the user # i, an effective channel matrix for the user # i is given by Expression (6), and the null steering is applied to the users other than the user # i and the user # i+1.

$$\overline{H}_{e,i} = \overline{H}V_i^{(n)} = \begin{bmatrix} \vdots \\ 0 \\ H_i V_i^{(n)} \\ H_{i+1} V_i^{(n)} \\ 0 \\ \vdots \end{bmatrix} \quad (6)$$

Further, a beam space appropriate for the user # i is formed from the desired element $H_i V_i^{(n)}$ for the user # i in the Expression (6). In other words, the SVD is applied to $H_i V_i^{(n)}$, or the eigenvalue decomposition is applied to non-negative value Hermitian matrix, $(H_i V_i^{(n)})^H H_i V_i^{(n)}$, to thereby obtain an eigenvector matrix $V_i^{(n)}$ corresponding to large eigenvalues.

After a signal space is formed only for the user # i and the user # i+1 by multiplying $V_i^{(e)}$ after the null steering through $V_i^{(n)}$, beam forming for increasing a reception gain at the user # i can be achieved. As a result, the precoding matrix for the user # i in the present invention is given by Expression (7).

$$B_i = V_i^{(n)} V_i^{(e)} \qquad (7)$$

An IUI user cannot be set for the last user. Therefore, a precoding matrix that does not permit interference and thus achieves a complete null steering for the other users is acquired as in the ordinary BD. Specifically, an $(N_{w, \, total} = N_w) \times N_b$ matrix that is obtained by removing desired channel elements from the system channel matrix and is given as follows is defined for the user # $N_{usr}$.

$\overline{H}_{N_{usr}}$

It is assumed that singular value decomposition given by Expression (8) can be carried out.

$$\overline{H}_{N_{usr}} = \begin{bmatrix} H_1 \\ H_2 \\ \vdots \\ H_{N_{usr}-1} \end{bmatrix} = \qquad (8)$$

$$U_{N_{usr}} \Sigma_{N_{usr}} V_{N_{usr}}^H = U_{N_{usr}} \begin{bmatrix} \Sigma_{N_{usr}}^{(s)} & 0 \\ 0 & 0 \end{bmatrix} \begin{bmatrix} \Sigma_{N_{usr}}^{(s)H} \\ V_{N_{usr}}^{(n)H} \end{bmatrix}$$

In Expression (8), $U_{N_{usr}}$ is a left singular vector matrix $\overline{H}_{N_{usr}}$, $V_{N_{usr}}$ is a right singular vector matrix thereof, and $\Sigma_{N_{usr}}$ is a singular value matrix having singular values as diagonal elements. In the singular value matrix $\Sigma_{N_{usr}}$, when singular values of the diagonal elements are arranged in descending order of the magnitude, as given by Expression (8), the singular value matrix $\Sigma_{N_{usr}}$ can be divided into, and can be expressed as a partial diagonal matrix $\Sigma_{N_{usr}}^{(s)}$ constructed of $(N_{w, \, total} - N_w)$ non-zero singular values and zero matrices corresponding to $(N_b - (N_{w,total} - N_w))$ zero singular values.

Moreover, right singular vectors $V_{N_{usr}}^{(s)}$ and $V_{N_{usr}}^{(n)}$ corresponding to the respective matrices exist. When $V_{N_{usr}}^{(n)}$ is defined as a precoding matrix for the user # $N_{usr}$, an effective channel matrix for the user # Nusr is given by Expression (9), and the null steering is applied to the users other than the user # $N_{usr}$.

$$\overline{H}_{e,N_{usr}} = \overline{H} V_{N_{usr}}^{(n)} = \begin{bmatrix} H_1 V_{N_{usr}}^{(n)} \\ H_2 V_{N_{usr}}^{(n)} \\ \vdots \\ H_{N_{usr}-1} V_{N_{usr}}^{(n)} \\ H_{N_{usr}} V_{N_{usr}}^{(n)} \end{bmatrix} = \begin{bmatrix} 0 \\ 0 \\ \vdots \\ 0 \\ H_{N_{usr}} V_{N_{usr}}^{(n)} \end{bmatrix} \qquad (9)$$

As described above, when the precoding matrices that permit the interference to the next user for the user #1 to the user #(Nuser−1) and achieve the null steering for the other users are obtained, and are applied to the system channels, an effective system channel matrix given by Expression (10) is observed.

$$\overline{H}_e = \begin{bmatrix} H_1 B_1 & 0 & 0 & \cdots & 0 & 0 \\ H_2 B_1 & H_2 B_2 & 0 & \cdots & 0 & 0 \\ 0 & H_3 B_2 & H_3 B_3 & \ddots & \vdots & \vdots \\ \vdots & \vdots & \ddots & \ddots & \ddots & \vdots \\ 0 & 0 & \cdots & H_{N_{usr}-1} B_{N_{usr}-2} & H_{N_{usr}-1} B_{N_{usr}-1} & 0 \\ 0 & 0 & \cdots & 0 & H_{N_{usr}} B_{N_{usr}-1} & H_{N_{usr}} B_{N_{usr}} \end{bmatrix} \qquad (10)$$

As appreciated from Expression (10), the effective system channel matrix is block bi-diagonalized. In other words, hierarchization, in which the number of interference permissible users is one, is achieved. As a result, non-linear MU-MIMO processing that carries out successive interference cancellation on the transmission side can be applied as described below.

The non-linear processor 130 utilizes the above-mentioned block bi-diagonalization, to thereby be able to remove elements, which become the IUI on the reception side, on the transmission side in advance. From the effective system channel matrix given by Expression (10), the reception signal observed by a user # i (i≥2) is given by Expression (11).

$$r_i(t) = H_i B_i \sqrt{P_i} s_i(t) + H_i B_{i-1} \sqrt{P_{i-1}} s_{i-1}(t) + n_i(t) \qquad (11)$$

When a transmission signal $s_{i-1}(t)$ to the user #(i−1) is determined, interference at a reception point can be canceled by setting $S_i(t)$ to a signal given by Expression (12).

$$\tilde{s}_i(t) = s_i(t) - \frac{H_i B_{i-1} \sqrt{P_{i-1}}}{H_i B_i \sqrt{P_i}} s_{i-1}(t) \qquad (12)$$

The IUI does not exist for the reception signal of the user #1. Therefore, the above-mentioned processing is not required to be applied. The IUI at each of the reception user terminals can be canceled in advance by using the above-mentioned processing to successively determine the transmission signal starting from the user #2.

Moreover, the number of interference cancellations can be limited to that for one user by applying the precoding matrix in the first embodiment, which is different from the general non-liner MU-MIMO, in which the number of transmission interference cancellations increases in proportion to the number of users. Therefore, a computation amount can be reduced, and reduction in SNR can also be suppressed.

However, a signal actually transmitted through the transmission processing given by Expression (12) presents an expansion or a contraction, and thus becomes unstable. Thus, the non-linear processor 130 may apply processing of stabilizing the transmission signal waveform through a modulo operation disclosed in Patent Literature 4 or perturbation processing disclosed in Patent Literature 5.

As described above, the first embodiment has the configuration of carrying out the precoding that permits the user next to the target user as the IUI user in the MU-MIMO downlink. As a result, the non-liner MU-MIMO method that can hierarchize the multi-user space, can reduce the computation amount, and can suppress reduction in SNR can be achieved.

An arrangement order of the users is extremely important in a procedure of determining the interfering user of the above-mentioned precoding matric computation. The user ordering processor 121 illustrated in FIG. 7 determines the user order and the power distribution. The user ordering processor 121 has functions to determine the user order, and instructs the precoder 120 on the order and the power distribution. The order of the users and the pairing with the IUI user who becomes an interfering/interfered user are important in the ordering.

Due to a nature of the linear precoding, when close users having a high channel correlation are paired with each other, an effect of improving the reception SNR increases. As an example of criteria for the ordering, the following criteria can be given.

(Criterion 1) Ordering is determined in accordance with a channel gain (square of the Frobenius norm of the channel matrix) of each of the users.

(Criterion 2) Ordering is determined in accordance with the maximum eigenvalue of each of the users.

(Criterion 3) Ordering is determined so that the correlation of the channel matrices of the users next to each other becomes high.

However, this computation carried out each time the precoding weights are calculated poses a problem in terms of the computation amount. Thus, the user ordering processor 121 in the first embodiment uses information on the beam radiation directions of the beam forming controller 141 to carry out the ordering.

Branch forming on two stages is carried out in the MU-MIMO system of the beam forming type illustrated in FIG. 2 to FIG. 5. In other words, the array antenna is controlled to form beams toward the positions of the users on a first stage. Then, beam synthesis (precoding) is carried out to cancel the interferences among the streams through the MIMO signal processing on a second stage.

In this case, the beams formed through the beam forming on the first stage are rough beams formed by the analog devices. Thus, a main lobe of each of the beams formed on the first stage simply directs to each of the users, and side lobes of the beam becomes interferences for other users.

Meanwhile, when a plurality of streams are simultaneously transmitted, those interferences are required to be canceled. The interference cancellation among streams on the second stage is strict cancellation of the interferences among the streams.

Particularly in the configurations of FIG. 2 and FIG. 3, the first stage is achieved through the control by the analog phase shifters, and the second stage is achieved through the digital signal processing. Further, variations in the positions of the users is much slower than a scheduling speed. Therefore, an operation frequency of the beam forming processor 140 on the first stage is often lower than the operation of the precoder 120 on the second stage.

Based on this nature, the user ordering processor 121 uses information on the beam radiation direction to carry out effective ordering at a low computation amount. A description is now given of a specific procedure.

The user ordering processor 121 receives the information on the beam radiation direction from the beam forming controller 141, to thereby estimate a positional relationship among the users. Statistically, as the positions of the users become closer to each other, a correlation between channels becomes higher. Thus, the user ordering processor 121 carries out the ordering of the users in accordance with the following procedure.

(Step 1) Select any user as user #1. Set i to 1.

(Step 2) Select a user at a position closest to the user # i as user # i+1.

(Step 3) Finish the procedure when the ordering for all the users is finished. When a user who has not been selected yet exists, set i to i+1, and return to (Step 2).

As another ordering method, use of received power of each of the users is conceivable. A main beam of each of the beams is directed toward a direction in which the user exists, and signal power from the user is thus considered to be dominant in this direction. Thus, the user ordering processor 121 carries out the ordering based on the received power of each of the beams observed by the beam forming controller 141, to thereby be able to pair users existing close to one another.

As the ordering, an arrangement in ascending order or descending order of the received power is conceivable. Received power intensity information on each of the beams or each of the users may be acquired from another function block, for example, a higher layer.

For the power distribution among streams, for example, a method of determining the distribution based on a channel gain of each of the users in accordance with the water filling theorem or a method of distributing power so that reception qualities of all the users are equalized can be given. In the first embodiment, the method for the power distribution is not particularly prescribed.

The first embodiment is described while the example of the BBD, in which the number of IUI permissible users is one, is used. However, the number of IUI permissible users may be any number. In this case, a liner precoder configured to form null for the users other than the desired user and the IUI permissible users operates, and then, the IUI-PC is applied so that the interference from all the IUI users is suppressed.

Further, the number of IUI permissible users may change in accordance with each of the streams. In this case, the block triangulation (BT) method described in Non Patent Literature 3 can be adopted.

Second Embodiment

In order to build a large-scale mobile communication system, a plurality of base stations are required to operate in cooperation with each other. Thus, in the second embodiment, a description is given of a configuration including a control station 300 configured to supervise and control a plurality of base stations in an environment in which a plurality of base stations exist.

Figure 9:
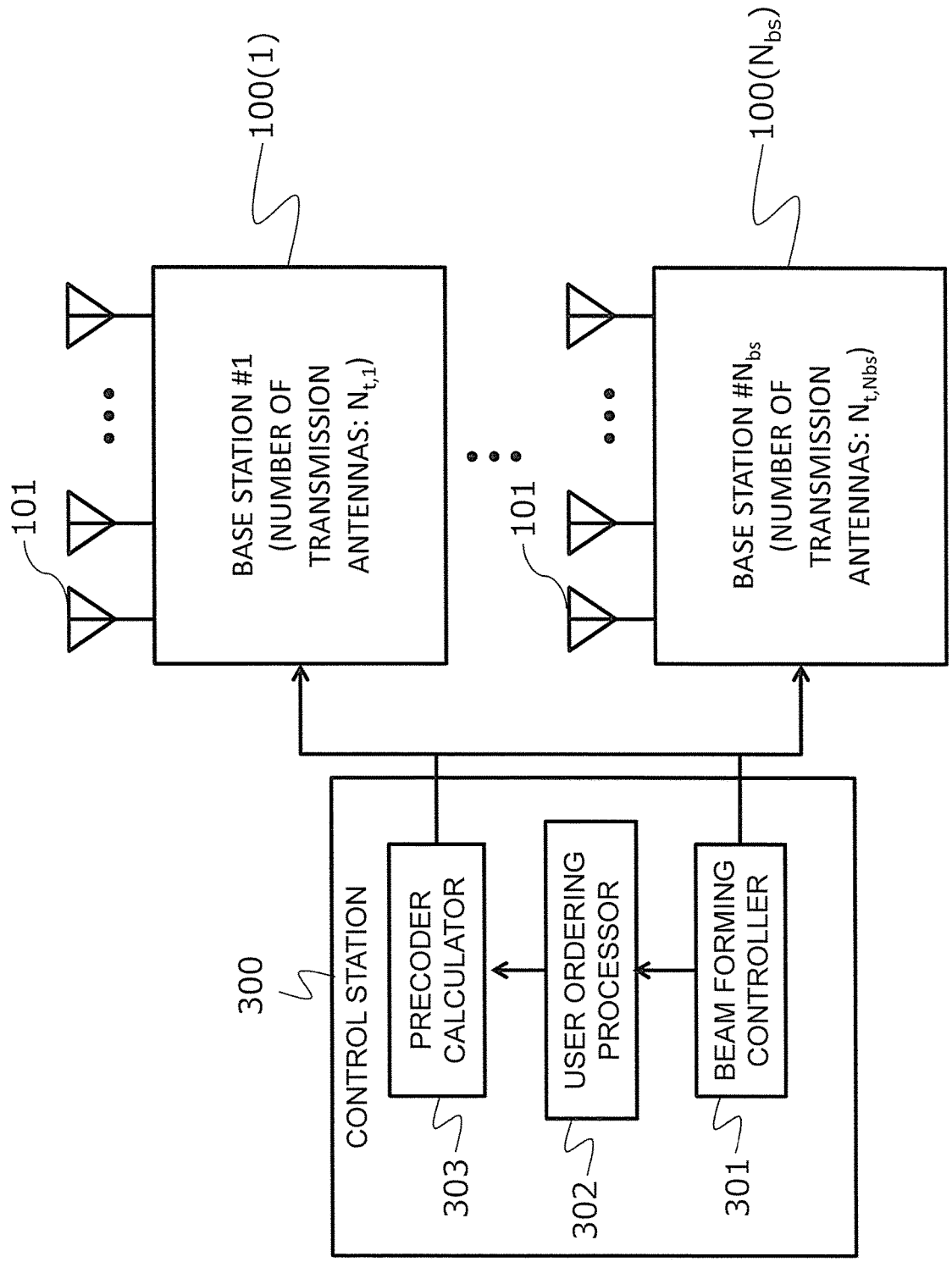
FIG. 9 is a configuration diagram for illustrating a mobile communication system of a second embodiment of the present invention.

FIG. 9 is a configuration diagram for illustrating a mobile communication system of the second embodiment of the present invention. In FIG. 9, a configuration in which $N_{bs}$ base stations 100 in the first embodiment exist, and $N_{bs}$ base stations 100(1) to 100 ($N_{bs}$) are controlled by the control station 300 is illustrated.

In the configuration illustrated in FIG. 9, it is important to consider that radiation regions of the beams or radiation regions of the branches do not overlap one another among the plurality of base stations 100. Thus, the control station 300 includes a beam forming controller 301, a user ordering processor 302, and a precoder calculator 303, and carries out beam control and calculates precoding weights for each of the base stations 100.

A description is now given of a specific operation of the control station 300 in the second embodiment.

The beam forming controller 301 in the control station 300 issues an instruction to the beam forming controller 141 of each of the base stations 100, to thereby control the directions of the beams to be radiated. The user ordering processor 302 in the control station 300 receives position information on users from the beam forming controller 301, and carries out ordering of the users in ascending order of the distance for each of the base stations 100.

Further, the precoder calculator 303 in the control station 300 calculates the precoding weights based on the user ordering information, and notifies each of the base stations 100 of the precoding weights. Each of the base stations 100(1) to 100($N_{bs}$) forms branches, and transmits signals through processing similar to that in the first embodiment based on the notified precoding weight information and user ordering information.

As described above, according to the second embodiment, even in the state in which the plurality of base stations operate in cooperation with each other, the user ordering is carried out by the control station, to thereby be able to improve the transmission performance of the MU-MIMO.

In the second embodiment, only the user ordering information may be notified from the control station 300 to the base station 100, and the calculation of the precoding weights may be carried out by each of the base stations 100.

The invention claimed is:

1. A transmission device, which is to be applied to a communication system in which a plurality of user terminals each including one or a plurality of reception antennas exist for a transmission device including a plurality of transmission antennas so that multi-user MIMO downlink communication is carried out, the transmission device comprising:
   a precoder configured to apply transmission precoding processing to a transmission signal to be transmitted to each of the plurality of user terminals;
   a nonlinear processor configured to carry out successive interference cancellation for the transmission signal to which the transmission precoding processing has been applied; and
   a beam forming controller configured to form a plurality of beams, a number of which is smaller than a number of the plurality of transmission antennas, based on the transmission signal for which the successive interference cancellation has been carried out, and to control a phase shifter or a digital signal processor, which is connected to the plurality of transmission antennas, to control a beam radiation direction,
   wherein the transmission device further comprises a user ordering processor configured to estimate a positional relationship among the plurality of user terminals from radiation direction information on each of the plurality of beams held by the beam forming controller, order users in ascending order of a distance from a specific user, determine a pairing of a transmission target user and an interference permissible user, and transmit a determination result to the precoder, and
   wherein the precoder is configured to determine two users of the transmission target user and the interference permissible user for each user based on the determination result received from the user ordering processor, and carry out null steering for users other than the two users, to thereby carry out the transmission precoding processing.

2. A transmission device according to claim 1, wherein the precoder is configured to carry out the null steering for users other than the two users, and then carry out eigenbeam forming for the transmission target user.

3. A transmission device according to claim 1, wherein the user ordering processor is configured to carry out the ordering by repeating the following processing including:
   (Step 1) selecting a user as a user #1, and setting i to 1;
   (Step 2) selecting a user at a position closest to the user # i from users who are yet to be selected, and setting the selected user as user # i+1; and
   (Step 3) when a user who is yet to be selected exists, setting i to i+1 and returning to (Step 2) until the ordering for all users is finished.

4. A transmission device according to claim 1,
   wherein the beam forming controller has a function of observing received power intensity of each of the plurality of formed beams, and
   wherein the user ordering processor is configured to carry out the ordering in ascending order or descending order of received power based on the received power intensity.

5. A transmission device according to claim 1, wherein the precoder is configured to set a number of permissible users of inter-user interference for each user as a value equal to or larger than one, determine as many users as the number of permissible users as the interference permissible users, and carry out the null steering for users other than the transmission target user and the interference permissible users, to thereby carry out the transmission precoding processing.

6. A communication system, comprising:
   the plurality of transmission devices of claim 1; and
   a control station configured to supervise and control the plurality of transmission devices,
   wherein the control station is configured to generate beam direction information and ordering information on each of the plurality of transmission devices so that radiation regions of beams are inhibited from overlapping one another among the plurality of transmission devices, and then transmit the beam direction information and the ordering information to each of the plurality of transmission devices, and
   wherein each of the plurality of transmission devices is configured to control the beam radiation direction based on the beam direction information, and carry out the transmission precoding processing based on the ordering information.

7. A communication system according to claim 6,
   wherein the control station is configured to further generate precoding weights based on the ordering information, and transmit the precoding weights to the respective plurality of transmission devices, and
   wherein each of the plurality of transmission devices is configured to carry out the transmission precoding processing based on the ordering information and the precoding weights.

8. A precoding computation method, which is carried out in a transmission device to be applied to a communication system in which a plurality of user terminals each including one or a plurality of reception antennas exist for a transmission device including a plurality of transmission antennas so that multi-user MIMO downlink communication is carried out, the precoding computation method comprising:

a first step of applying transmission precoding processing to a transmission signal to be transmitted to each of the plurality of user terminals;

a second step of carrying out successive interference cancellation for the transmission signal to which the transmission precoding processing has been applied; and a third step of forming a plurality of beams, a number of which is smaller than a number of the plurality of transmission antennas, based on the transmission signal for which the successive interference cancellation has been carried out, and controlling a phase shifter or a digital signal processor, which is connected to the plurality of transmission antennas, to control a beam radiation direction, wherein the precoding computation method further comprises a fourth step of estimating a positional relationship among the plurality of user terminals based on the beam radiation directions controlled in the third step, ordering users in ascending order of a distance from a specific user, and determining a pairing of a transmission target user and an interference permissible user, and wherein the first step includes determining two users of the transmission target user and the interference permissible user for each user based on the pairing determined in the fourth step, and carrying out null steering for users other than the two users, to thereby carry out the transmission precoding processing.

* * * * *